(No Model.)
P. J. GODFREY.
HOT CORN HOLDER.
No. 378,503.        Patented Feb. 28, 1888.
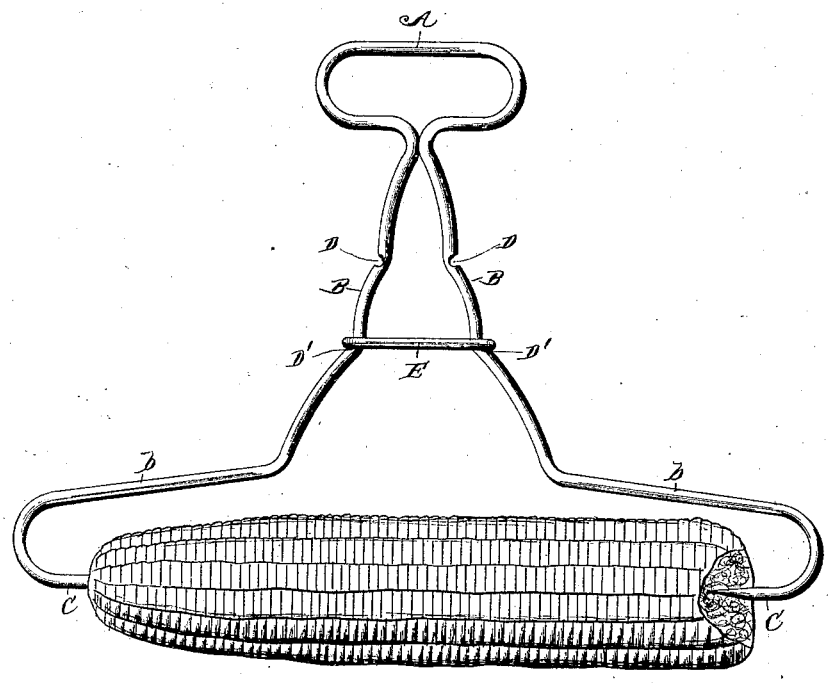
Witnesses
Inventor,
P. J. Godfrey.
By his Attorneys.

UNITED STATES PATENT OFFICE.

PHILIP J. GODFREY, OF TAUNTON, MASSACHUSETTS.

HOT-CORN HOLDER.

SPECIFICATION forming part of Letters Patent No. 378,503, dated February 28, 1888.

Application filed July 25, 1887. Serial No. 245,244. (No model.)

*To all whom it may concern:*

Be it known that I, PHILIP J. GODFREY, a citizen of the United States, residing at Taunton, in the county of Bristol and State of Massachusetts, have invented a new and useful Improvement in Hot-Corn Holders, of which the following is a specification.

My invention relates to an improvement in hot-corn holders; and it consists in a certain novel construction and arrangement of parts, fully set forth hereinafter, and specifically pointed out in the appended claims.

In the accompanying drawing, the figure is a side view of the device, showing an ear of corn held between the arms thereof.

Referring by letter to the drawing, A designates the handle or ring at the upper end of the device, and B B designate the arms diverging from the side of the said handle or ring and bent laterally outward at the upper ends. The said arms B B are provided on the extremities of the horizontal portions *b b* thereof with the hooks C C, the said hooks being pointed at the ends to engage in the ends of the ear of corn to be held. The outer sides of the diverging portions of the arms B B are notched, as seen at D D', the corresponding notches on the different arms being opposite.

E designates a ring or loop encircling the said diverging arms, and adapted to engage in any pair of the notches in the outer sides of the said arms to hold the arms at any desired extension. It will be seen that as the ring is pressed toward the outer ends of the diverging arms the said arms are drawn toward each other, and when the ring is engaged in any desired pair of the notches the arms are held at the desired extension to hold the ear of corn between the hooks thereof firmly in place.

It will be seen that the object in having the arms of the device provided with a series of notches is to enable the holder to be applied to any sized ear of corn, and when about to be applied the ring is drawn down to the handle of the device, the hooks C aligned with the ends of the ear, and the ring pressed up until the said hooks engage firmly in the ear, when the said ring is allowed to engage in one of the notches.

It will be understood that the device herein described is designed to be used to hold corn at meals, to prevent the hands from being soiled, and although it is preferably made of steel, to cause the arms thereof to normally spring outwardly, it may be silvered or ornamented in any preferred manner to render it pleasing to the eye.

Having thus described my invention, what I claim, and desire to secure by Letters Patent, is—

1. In hot-corn holder, the diverging arms D D, notched on the outer sides, the hooks C C on the ends of the said arms, and the ring E, to slide on the said arms and engage in the said notches to hold the arms at the proper adjustment, substantially as specified.

2. In a hot-corn holder, the handle A, arms D D, diverging from the side of the said handle, having notches D D' in the outer sides thereof, horizontal extensions *b b* of the said arms, hooks C C on the ends of the said extensions, and the ring E, sliding on the diverging portions of the arms B B and engaging in the notches in the outer sides thereof, substantially as specified.

In testimony that I claim the foregoing as my own I have hereto affixed my signature in presence of two witnesses.

PHILIP J. GODFREY.

Witnesses:
 ELISHA T. JACKSON,
 JOHN C. REYNOLDS.